O. E. JOSEPH.
ROAD RECORDER AND INDICATOR.
APPLICATION FILED JAN. 6, 1915.

1,244,743.

Patented Oct. 30, 1917.
2 SHEETS—SHEET 1.

INVENTOR
O. E. JOSEPH.

WITNESSES

BY

ATTYS.

O. E. JOSEPH.
ROAD RECORDER AND INDICATOR.
APPLICATION FILED JAN. 6, 1915.

1,244,743.

Patented Oct. 30, 1917.
2 SHEETS—SHEET 2.

WITNESSES

INVENTOR
O. E. JOSEPH.
BY
ATTYS.

UNITED STATES PATENT OFFICE.

ORVILLE E. JOSEPH, OF MOOSE JAW, SASKATCHEWAN, CANADA.

ROAD RECORDER AND INDICATOR.

1,244,743.  Specification of Letters Patent.  Patented Oct. 30, 1917.

Application filed January 6, 1915. Serial No. 867.

*To all whom it may concern:*

Be it known that I, ORVILLE ERNEST JOSEPH, a subject of the King of Great Britain, and resident of Moose Jaw, in the Province of Saskatchewan, in the Dominion of Canada, have invented certain new and useful Improvements in Road Recorders and Indicators, of which the following is the specification.

This invention relates to road recorders and indicators and the objects of the invention are to facilitate vehicles in negotiating or traveling over roads with which the driver is unfamiliar, to render the device adaptable for recording the travel of the roads, to render the device capable of being reversed, to simplify the mechanism and reduce the number of working parts and generally to adapt the device to better perform the functions required of it, and it consists essentially of the improved construction particularly described in the following specification and accompanying drawings forming part of the same.

In the drawings.

Like characters of reference refer to like parts in the several figures.

Figure 1:
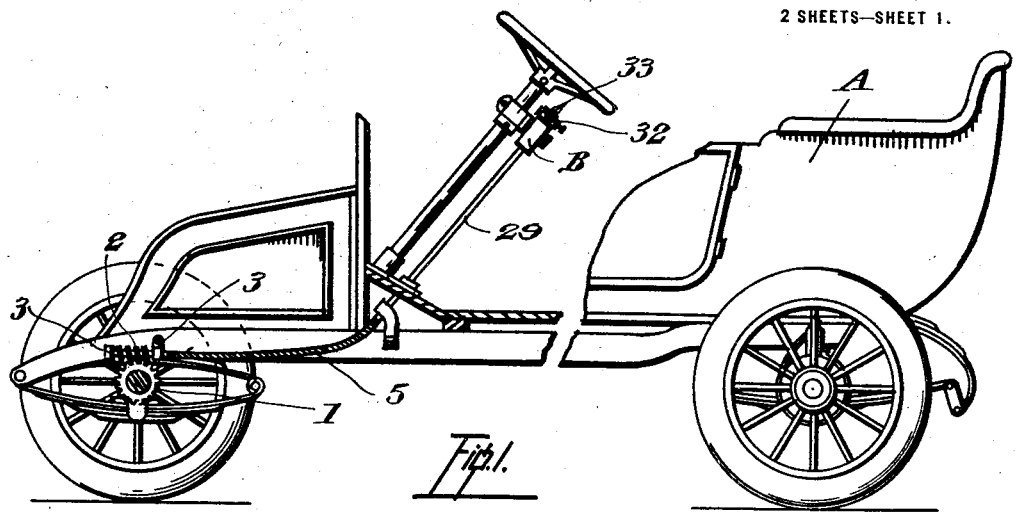
Figure 1 is a side elevation of an automobile, broken away, showing the improved device mounted thereon.
Figure 3:
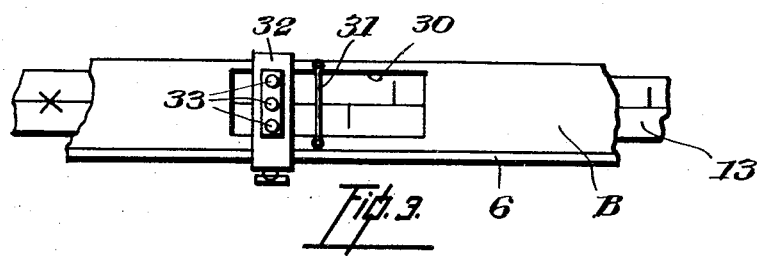
Fig. 3 is a plan view of the casing, broken away, showing the recording mechanism mounted on the top thereof.
Figure 2:
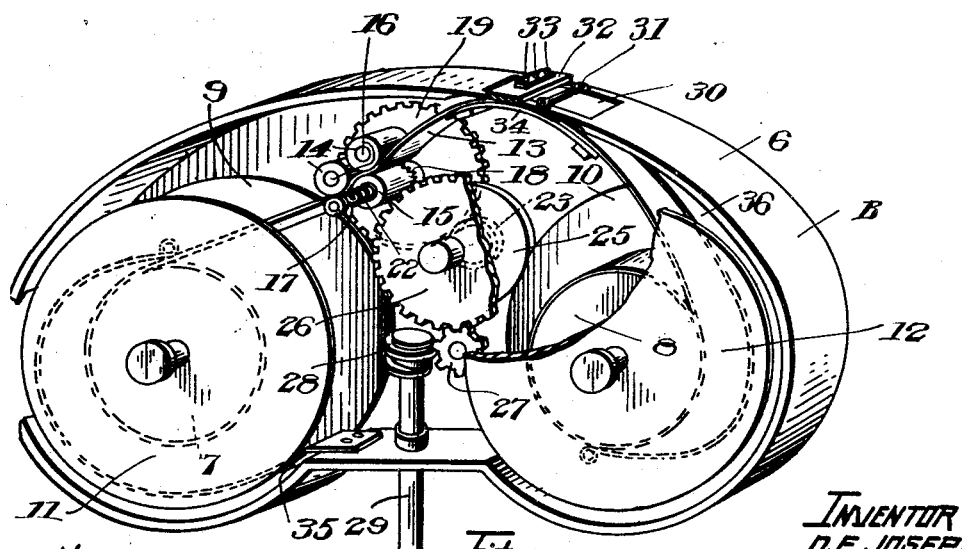
Fig. 2 is a perspective view of the improved device with the front of the casing removed.
Figure 7:
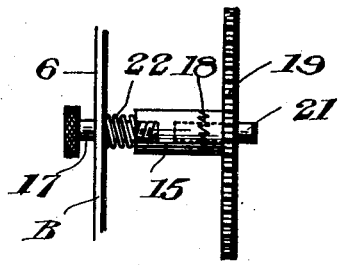
Fig. 7 is a plan of one of the rollers and the pinion with which it engages.
Figure 6:
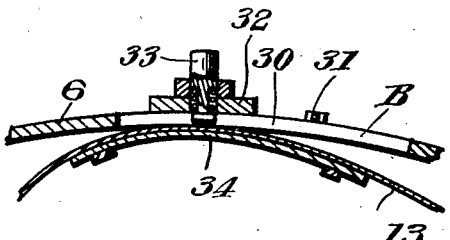
Fig. 6 is a sectional elevation of the recording mechanism.
Figure 5:
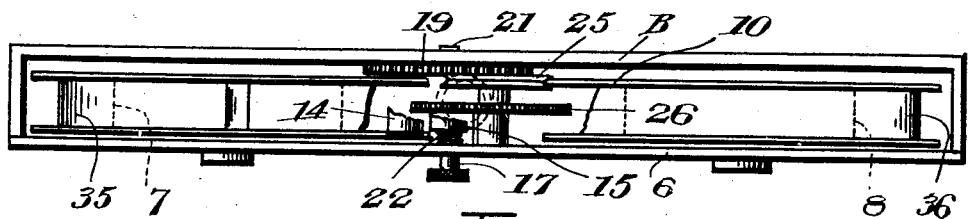
Fig. 5 is a plan view of the improved device.
Figure 4:
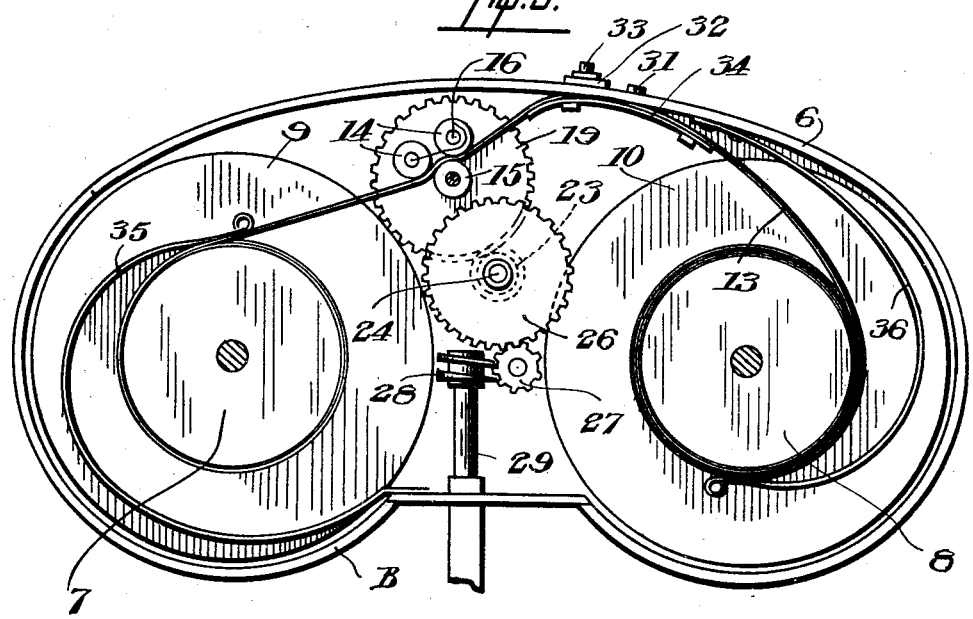
Fig. 4 is a side elevation of the improved device with the front of the casing removed.

Referring to the drawings, A represents an automobile and B the improved recorder and indicator mounted thereon, said automobile being of any usual construction well known in the art requires no further description.

Mounted on one of the front wheels of the automobile is a pinion wheel 1 which is designed to engage with a worm 2 rotatably mounted in the brackets 3 carried by the chassis, the said worm transmitting its motion through the medium of a flexible drive 5 to a recorder and indicator B which is preferably mounted on the casing of the steering means, thereby permitting of the said indicator being at all times under the eye of the chauffeur.

The recorder and indicator B comprises a casing 6 of any usual construction adapted to house the mechanism which comprises interchangeable rollers 7 and 8 rotatably mounted in the said casing. These rollers are constructed with one of the flanges 9 and 10 formed integral therewith, the opposite flanges 11 and 12 being detachable to facilitate in removing or replacing tapes 13 on the said rollers.

Located intermediate of the rollers 7 and 8 are a plurality of rollers 14 and 15, the former of which are rotatably mounted on the spindle 16 carried by the cover of the casing 6, the latter being rotatably supported by the spindle 17 which is adapted to pass through the casing cover and being provided with a plurality of serrations or teeth 18 adapted to engage with the serrations on the hub of the pinion wheel 19.

It is desirable that the roller 15 should be capable of lateral movement and to prevent the said roller being displaced from the pinion 19 the spindle 21 supporting the pinion 19 projects partially through the said roller.

To insure of the roller 15 being held in engagement with the teeth of the hub in the wheel 19, a spiral spring 22 is mounted in the spindle 17 and located between the cover of the casing and the end of the said roller.

The pinion wheel 19 is designed to mesh with the pinion wheel 23 carried on the spindle 24, such spindle being further provided with the friction wheel 25 designed to engage with the fixed flange 10 of the roller 8 and carrying a pinion wheel 26 adapted to mesh with the pinion wheel 27 rotatably supported in said casing.

Motion is transmitted to the pinion wheel 27 through the medium of the worm 28 mounted on one end of the spindle 29 the opposite end of said spindle being connected to the flexible drive 5.

The casing 6 is provided on its upper face with an aperture 30 beneath which the tape 13 is designed to pass and extending transversely across the said aperture is an index 31 adapted to indicate the sinuosities of the path to be followed by the automobile.

Adjacent to the index 31 an indicating mechanism 32 is mounted, which consists of a plurality of stamps 33 preferably held in a normal position spring pressed upwardly, and designed to impress upon the tape 13 and delineate thereon the path of the road traversed by the automobile.

To permit of the tape 13 being held in the desired position beneath the aperture 30 a guide plate 34 is provided. It is desirable that the tape 13 should be held in contact with the rollers 7 and 8 and to this end leaf springs 35 and 36 are provided, one end of the said springs being rigidly mounted to the said casing, the other end being suitably curled and adapted to engage with the said tape.

In assembling the device, the tape is placed upon the roller 7 which is inserted in the casing 6, the said tape being led through between the rollers 14 and 15 over the guide plate 34 and around the roller 8.

When the journey is commenced the motion from the front wheel of the automobile is transmitted through the medium of the pinion wheel 1 and the worm 2 to the flexible member 5 which in turn rotates the spindle 29 carrying the worm 28. This motion is transmitted to the pinion wheel 27, thence to the pinion wheel 26 which rotates the spindle 24, the motion being transmitted through the medium of the pinion wheel 23 to the pinion wheel 19 thereby rotating the roller 15 and causing the tape 13 to be fed from the roller 7 to the roller 8.

Simultaneously with this rotation of the rollers 14 and 15, the friction wheel 25 transmits its motion to the roller 8 through the medium of the flange 10 so that at all times the tape 13 is in a state of tension.

Should any slip of the tape 13 take place, and it is found desirable to adjust the same, the roller 15 is disengaged from the hub of the pinion wheel 17, the said roller being rotated to a limited extent until the error is corrected, the configuration on the tape 13 registering with the index 31 on the casing.

When the device is being used to record a road between two predetermined points the several turns or branch roads together with other physical irregularities are noted on the tape 13 by means of the stamps 33, the said stamps being operated by the chauffeur as the several turns or impediments are encountered.

When the device is used as an indicator, it will be understood that as the automobile travels the configurations on the tape 13 register with the index 31 so that the car is steered according to the directions on the said tape. On the return journey it is only necessary to interchange the rollers 7 and 8, the subsequent operation being the same as those described above.

From this description it will be seen that I have invented a device such as will enable any one to traverse a road in an automobile or like vehicle with which road he was previously unacquainted, the said device being easily assembled and connected in an operative position to the said vehicles.

What I claim as my invention is:

A recorder and indicator of the class described comprising a casing having an orifice through the top thereof, a guide member below the orifice, interchangeable flanged rollers mounted in the casing, a tape on said rollers engaging with the guide member, a wheel frictionally engaging one of the flanges and adapted to rotate one of the rollers, a pair of spaced rollers between the first said rollers engaging the outer face of the tape, a third adjustable roller located intermediate of the last said rollers engaging the inner face of the tape, a train of gearing designed to drive the last said roller and friction wheel, and ratchet means between the last said roller and train of gearing.

In witness whereof I have hereunto set my hand in the presence of two witnesses.

O. E. JOSEPH.

Witnesses:
  J. H. SMITH,
  A. H. JOSEPH.